US010147999B2

United States Patent
Wang et al.

(10) Patent No.: US 10,147,999 B2
(45) Date of Patent: Dec. 4, 2018

(54) NFC ANTENNA WITH A METAL BACK COVER

(71) Applicant: Shenzhen Sunway Communication Co., Ltd., Shenzhen, Guangdong (CN)

(72) Inventors: Di Wang, Shenzhen (CN); Anping Zhao, Shenzhen (CN); Hao Chen, Shenzhen (CN)

(73) Assignee: SHENZHEN SUNWAY COMMUNICATION CO., LTD., Shenzhen (CN)

( * ) Notice: Subject to any disclaimer, the term of this patent is extended or adjusted under 35 U.S.C. 154(b) by 45 days.

(21) Appl. No.: 14/897,136

(22) PCT Filed: Nov. 10, 2015

(86) PCT No.: PCT/CN2015/094188
§ 371 (c)(1),
(2) Date: Aug. 17, 2016

(87) PCT Pub. No.: WO2017/004917
PCT Pub. Date: Jan. 12, 2017

(65) Prior Publication Data
US 2017/0012343 A1    Jan. 12, 2017

(30) Foreign Application Priority Data

Jul. 8, 2015  (CN) .......................... 2015 1 0397707

(51) Int. Cl.
*H01Q 1/24*   (2006.01)
*H01Q 1/22*   (2006.01)
(Continued)

(52) U.S. Cl.
CPC .......... *H01Q 1/243* (2013.01); *H01Q 1/2208* (2013.01); *H01Q 1/36* (2013.01); *H01Q 1/42* (2013.01);
(Continued)

(58) Field of Classification Search
CPC ...................................................... H01Q 1/243
(Continued)

(56) References Cited

U.S. PATENT DOCUMENTS

| 2011/0050164 A1* | 3/2011 | Partovi | H01F 5/003 |
| | | | 320/108 |
| 2012/0091821 A1* | 4/2012 | Kato | H01Q 1/38 |
| | | | 307/104 |

(Continued)

FOREIGN PATENT DOCUMENTS

| CN | 204271251 U | * | 4/2015 |
| EP | 2 562 858 A1 | | 8/2011 |
| WO | WO 2015/098462 A1 | | 7/2015 |

OTHER PUBLICATIONS

Chinese Office Action dated May 22, 2017, issued by the State Intellectual Property Office in corresponding application CN 201510397707.5.
(Continued)

*Primary Examiner* — Dameon E Levi
*Assistant Examiner* — Walter Davis
(74) *Attorney, Agent, or Firm* — Stein IP, LLC

(57) ABSTRACT

An NFC antenna includes a first metal back cover and an antenna coil located on the inner side of the first metal back cover, a through-hole and a first slit are formed in the first metal back cover, the first slit is connected with one edge of the through-hole and one edge of the first metal back cover, the antenna coil surrounds the through-hole and the first slit, and one part of the antenna coil does not coincide with the first metal back cover and is not intersected with the first slit. Through the above manner, the effect of optimally changing the flow direction distribution and intensity of eddy currents can be achieved, the eddy current loops are used to enhance the performance of the antenna, and the shielding effect of the metal back is eliminated.

11 Claims, 7 Drawing Sheets

(51) Int. Cl.
  *H01Q 1/42*    (2006.01)
  *H01Q 1/48*    (2006.01)
  *H01Q 7/00*    (2006.01)
  *H01Q 1/36*    (2006.01)
  *H01Q 1/50*    (2006.01)
  *H04B 5/00*    (2006.01)

(52) U.S. Cl.
  CPC ............... *H01Q 1/48* (2013.01); *H01Q 1/50* (2013.01); *H01Q 7/00* (2013.01); *H04B 5/0031* (2013.01)

(58) Field of Classification Search
  USPC ........................................................ 343/702
  See application file for complete search history.

(56) References Cited

U.S. PATENT DOCUMENTS

| | | | | |
|---|---|---|---|---|
| 2012/0306714 | A1* | 12/2012 | Yosui ................... | H01Q 1/2208 343/788 |
| 2013/0050045 | A1* | 2/2013 | Chacinski .............. | H01Q 1/243 343/848 |
| 2013/0207852 | A1* | 8/2013 | Nakano ................ | H01Q 1/2225 343/702 |
| 2015/0076922 | A1 | 3/2015 | Kato et al. .................... | 307/104 |

OTHER PUBLICATIONS

Extended European Search Report dated Jan. 12, 2017, issued by the European Patent Office in corresponding application EP 15797242.3.

* cited by examiner

NFC ANTENNA WITH A METAL BACK COVER

CROSS-REFERENCE TO RELATED APPLICATIONS

This application is a national stage of International Application No. PCT/CN2015/094188, filed Nov. 10, 2015, which claims the benefit of priority to Chinese Application No. 201510397707.5, filed Jul. 8, 2015, in the State Intellectual Property Office, the disclosures of which are incorporated herein by reference.

TECHNICAL FIELD

The invention relates to the technical field of communication, in particular to an NFC antenna with a metal back cover.

DESCRIPTION OF RELATED ART

With the development of the near field communication of mobile devices at the current stage, NFC functionality will be configured in more portable devices, and therefore research on NFC antenna design has been attracting more and more attention. In the application of traditional NFC antennas, generally, an FPC (namely an NFC antenna radiator) is placed on a battery. Meanwhile, in order to reduce the negative effect of the battery (namely metal) on the NFC antenna, a layer of ferrite is additionally placed between the FPC and the battery. The design scheme of NFC antennas is suitable for situations where the back covers of the portable devices are made of non-metal. However, recently the preference of consumers for mobile devices with metal covers is starting to rise, and it brings greater difficulty to the design of the NFC antennas. That is because when an NFC antenna is directly placed behind a (complete) metal cover, an eddy current loop completely opposite to the electric current of the NFC antenna is generated on the metal back cover, the metal back cover has a shielding effect on the electromagnetic field, and therefore the NFC antenna placed behind the metal cover cannot be detected outside the metal back cover (opposite to the side where the NFC antenna is placed). However, once the metal back cover is appropriately treated, for example, a slit is formed in the edge of the metal back cover, the original completely opposite eddy current loop generated on the metal back cover is 'cut off' at the edge position of the metal back cover, and an eddy current loop in the same direction as the electric current of the antenna is generated at the same time. The performance of an NFC antenna coil itself is enhanced by the eddy current loop in the same direction generated by the slit formed in the edge, and meanwhile the shielding effect of the metal back cover on the NFC antenna is overcome so that the NFC antenna can be detected outside the metal back cover. So far, few feasible design schemes for NFC antennas with full metal back covers are available.

FIG. 1 is the structural diagram of an antenna coil 20 commonly used in the prior art. A metal back cover 21 comprises a through-hole and a slit, one end of the slit is connected with one edge of the through-hole, the antenna coil 20 surrounds the through-hole 23 and is intersected with the slit 24, and the slit 24 can change the eddy current direction so that the antenna can be detected. However, the intersecting mode of the antenna coil 20 and the slit 24 cannot optimally change the direction and intensity of the eddy current loop, and consequently, the performance of the antenna system is limited, and optimal performance cannot be obtained.

BRIEF SUMMARY OF THE INVENTION

The technical aim of the invention is to provide an NFC antenna with excellent performance, and various parts of a metal back cover are fully utilized so as to improve the performance.

In order to achieve the technical aim, the technical scheme adopted in the invention is that an NFC antenna with a metal back cover is provided, the NFC antenna comprises a first metal back cover and an antenna coil, the antenna coil is located on the inner side of the first metal back cover, a through-hole and a first slit are formed in the first metal back cover, the first slit is connected with one edge of the through-hole and one edge of the first metal back cover, the antenna coil surrounds the through-hole and the first slit, and the part of the antenna coil does not coincide with the first metal back cover (overlap with the first metal cover in a direction perpendicular to the first metal back cover) and does not intersect with the first slit.

Furthermore, the antenna further comprises a second metal back cover, a second slit is formed between the second metal back cover and the first metal back cover, and the part not coinciding with the first metal back cover of the antenna coil with the second metal back cover.

Furthermore, the first slit is connected with (extends from the second slit and to) the through-hole.

Furthermore, the antenna coil is in a convex shape, a circular shape or an oval shape.

Furthermore, the size of the through-hole is 5 mm×5 mm-20 mm×20 mm.

Furthermore, the width of the first slit is 0.5 mm-1.5 mm, and the width of the second slit is 1.0 mm-2.5 mm.

Furthermore, a fingerprint identification module, a camera module, a flashlight module or other sensor modules are arranged in (to be operable through) the through-hole.

The NFC antenna has the advantages of fully utilizing the various parts of the metal back cover, the NFC antenna coil is arranged outside the through-hole and the first slit to be prevented from being intersected with the first slit, achieving more effectively or optimally changing the flow direction distribution and intensity of eddy currents, eddy current loops in the same direction as the current of the antenna can be simultaneously generated at the upper portion and the lower portion of the metal back cover, the performance of the antenna is further enhanced, and the shielding effect of the metal back covers on the NFC antenna is eliminated; the NFC antenna is characterized by a simple structure, excellent performance and the like.

DETAILED DESCRIPTION OF THE INVENTION

In order to give a detailed description of the technical contents, aims achieved, and effect of the invention, the invention is explained with a combination of implementation manners and drawings. The key concept of the invention is that an NFC antenna coil surrounds a through-hole and a slit so that an eddy current loop in the same direction as the electric current of the antenna can also be generated at the upper portion of a metal back cover, and the performance of the antenna is further enhanced.

The invention provides an NFC antenna with a metal back cover. The NFC antenna comprises a first metal back cover and an antenna coil, the antenna coil is located on the inner side of the first metal back cover, a through-hole and a first slit are formed in the first metal back cover, one edge of the through-hole is connected to one edge of the first metal back cover by the first slit, the antenna coil surrounds the through-hole and the first slit, and a part of the antenna coil does not coincide with the first metal back cover.

It can be known from the description that an NFC antenna with a metal back cover has the advantages of fully utilizing the various parts of the metal back cover, the NFC antenna coil is arranged outside the through-hole and the first slit to be prevented from being intersected with the first slit, the effect of optimally changing the flow direction distribution and intensity of eddy currents is achieved, eddy current loops in the same direction as the current of the antenna can be generated simultaneously at the upper portion and the lower portion of the metal back cover, the performance of the antenna is further enhanced, and the shielding effect of the metal back cover on the NFC antenna is eliminated. The NFC antenna is characterized by a simple structure, excellent performance and the like.

Furthermore, the antenna further comprises a second metal back cover, a second slit is formed between the second metal back cover and the first metal back cover, and the part not coinciding with the first metal back cover of the antenna coil coincides with the second metal back cover (the part not overlapping with the first metal back in a direction perpendicular to the first metal back cover).

Furthermore, the first slit is connected with the second slit and the through-hole.

Furthermore, the antenna coil is in a convex shape, a circular shape or an oval shape.

Furthermore, the size of the through-hole is 5 mm×5 mm-20 mm×20 mm.

Furthermore, the width of the slit is 0.5 mm-1.5 mm, and the width of the second slit is 1.0 mm-2.5 mm.

Furthermore, a fingerprint identification module, a camera module, a flashlight module or other sensor modules are arranged in the through-hole.

Embodiment 1

Figure 2:
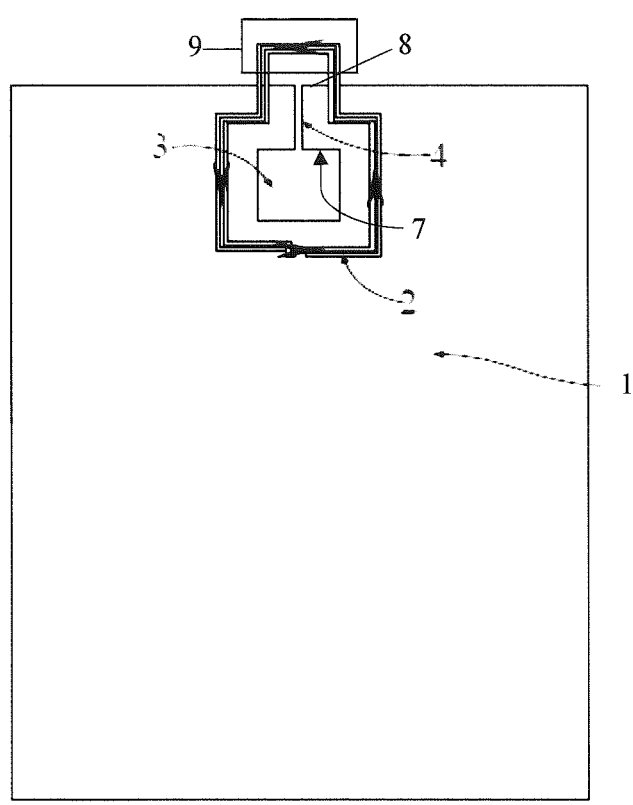
FIG. 2 is a structural diagram of an NFC antenna with a first metal back cover in embodiment 1 of the invention.

Please refer to FIG. 2, an NFC antenna with a metal back cover can be applied to portable mobile devices of cell phones, iPads, and the like, the NFC antenna comprises a first metal back cover 1 and an antenna coil 2, the antenna coil 2 is located on the inner side of the first metal back cover 1, namely on the side where the cell phone chip is arranged, a through-hole 3 and a first slit 4 are formed in the first metal back cover 1, the size of the through-hole 3 is 5 mm×5 mm-20 mm×20 mm, and 10 mm×10 mm is preferred. A smaller size of the through-hole influences the performance of the antenna, and a bigger size of the through-hole influences the integrity of the metal back cover as well as the layout of the components on the inner side of the metal back cover; a fingerprint identification module, a camera module, a flashlight module or other sensor modules are arranged operable through the through-hole 3; the first slit 4 is connected with one edge 7 of the through-hole 3 and one edge 8 of the first metal back cover 1, and is perpendicular to the one edge 7 of the through-hole 3. The width of the first slit 4 is 0.5 mm-1.5 mm, and 1 mm is preferred. The antenna coil 2 surrounds the through-hole 3 and the first slit 4, and one part 9 of the antenna coil 2 does not with the first metal back cover 1, namely one part 9 of the antenna coil 2 extends out of the first metal back cover 1. As shown in FIG. 2, the antenna is in the convex shape. Optionally, the antenna can be in a circular shape, an oval shape, or other shapes.

The first slit 4 is formed in the first metal back cover 1, the direction of the eddy current can be changed, the effective and the same direction of the eddy current loops are efficiently excited on the first metal back cover 1 with respect to the antenna coil 2, and the shielding effect of the first metal back cover 1 on the NFC antenna is eliminated so that the antenna can be detected from the outer side of the metal back cover 1; meanwhile, the antenna coil 2 surrounds the through-hole 3 and the first slit 4 at the same time, and the antenna coil 2 extends out of the first metal back cover and is not intersected with the first slit 4. The antenna coil 2 and the first slit 4 are in a non-intersecting state so that optimal effective eddy currents can be formed on the first metal back cover 1 and effective radiation can also be achieved. The effective eddy currents are enhanced, and therefore, the performance of the antenna is improved.

Embodiment 2

Figure 3:
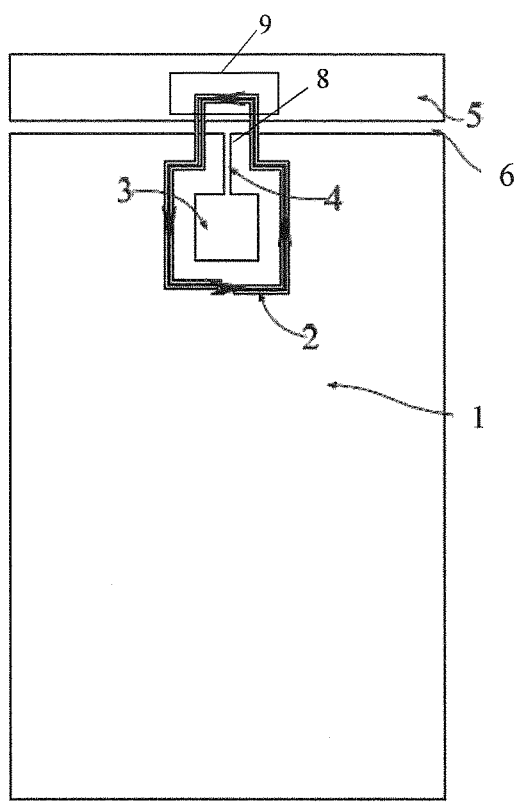
FIG. 3 is a structural diagram of an NFC antenna with a second metal back cover in embodiment 2 of the invention.

As shown in FIG. 3, in embodiment 2 of the invention, a second metal back cover 5 is additionally arranged on the basis of embodiment 1, the second metal back cover 5 is located above the first metal back cover 1, a second slit 6 is formed between the second metal back cover 5 and the first metal back cover 1, the first slit 4 is connected with the second slit 6 and the through-hole 3, the width of the second slit 6 is 1.0 mm-2.5 mm, and 2.0 mm is preferred. The part 9 of the antenna coil 2 not coinciding with the first metal back cover 1 coincides with the second metal back cover 5.

Figure 4:
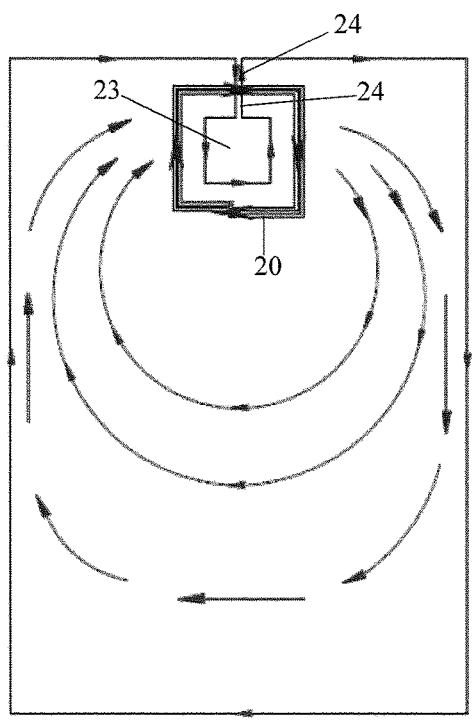
FIG. 4 is a diagram of an eddy current generated by the NFC antenna structure shown in FIG. 1.
Figure 5:
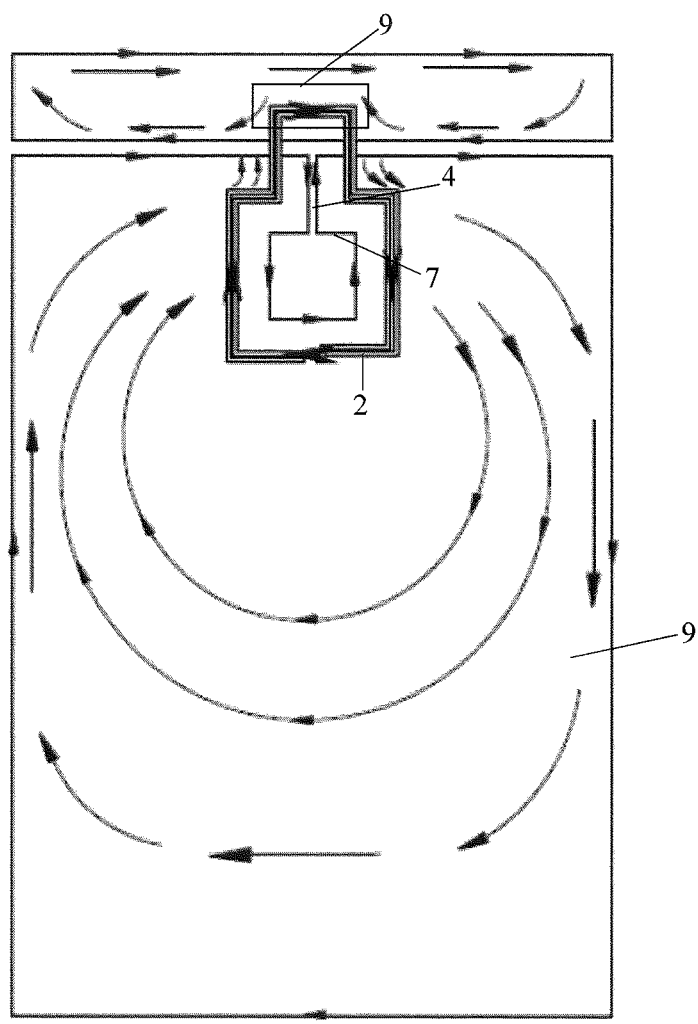
FIG. 5 is a diagram of an eddy current generated by the NFC antenna structure with a metal back cover in embodiment 1 of the invention.

One of the main characteristics of the wiring approach for the NFC antenna coil disclosed in the embodiment is that the part 9 of the antenna coil 2 of the NFC antenna is arranged at the inner side of the metal back cover 5. The wiring arrangement of the antenna coil 2 not only can ensure that the effective eddy current generated by the NFC coil on the first metal back cover 1 is not damaged or weakened, but also can effectively excite the effective eddy current (in the same direction as the eddy current generated on first the metal back cover 1 on the second metal back cover 5. Compared with the scheme in the prior art where the effective eddy current is only excited on the first metal back cover 1, the effective eddy currents on the first metal back cover 1 and the second metal back cover 5 can be excited at the same time by means of the scheme, and the superposition of the effective eddy currents in the same direction on the first metal back cover 1 and the second metal back cover 5 further enhances the performance of the NFC antenna. The specific analysis is as follows, FIG. 4 is the distribution of the effective eddy current generated by the NFC antenna on the first metal back cover 1 under the condition of only having the first metal back cover 1. It can be seen that the eddy current is basically limited in the region of the first metal back cover 1. FIG. 5 is the distribution of the eddy currents generated by the NFC antenna in the embodiment on the first metal back cover 1 and the second metal back cover 5. It can be seen from FIG. 4 and FIG. 5 that the magnetic flux are all pointing from the outside of the metal back cover to the inside of the metal back cover, therefore the direction of the effective eddy current loops is clockwise and is the same as the electric current direction of the antenna itself. It can be seen by comparing FIG. 4 with FIG. 5 that the NFC antenna in the embodiment not only excites the eddy current on the first metal back cover 1, but also effectively excites the eddy current on the second metal back cover 5 at the same time. Specifically, it can be seen from FIG. 5 that due to the fact that the NFC antenna coil 2 in the invention is not intersected with the first slit 4, the eddy current with positive contribution to the performance of the antenna is further excited on the first metal back cover 1 and the second metal back cover 5 in the direction nearly parallel and adjacent to the first slit 4. More important by is that all the eddy current loops on the first metal back cover 1 and the second metal back cover 5 are clockwise in the embodiment, namely that both of the eddy currents have an effective or enhancing effect on the antenna itself. The superposition of the effective eddy current on the first metal back cover 1 and the effective current on the second metal back cover 5 will certainly enhance the performance of the NFC antenna. Compared with the NFC scheme in the prior art, the intersection of the NFC antenna coil 2 and the first slit 4 is avoided, the effect of optimally changing the flow direction distribution and intensity of the eddy currents is achieved, and therefore, better antenna performance is achieved by means of the NFC design scheme of the invention.

Figure 1:
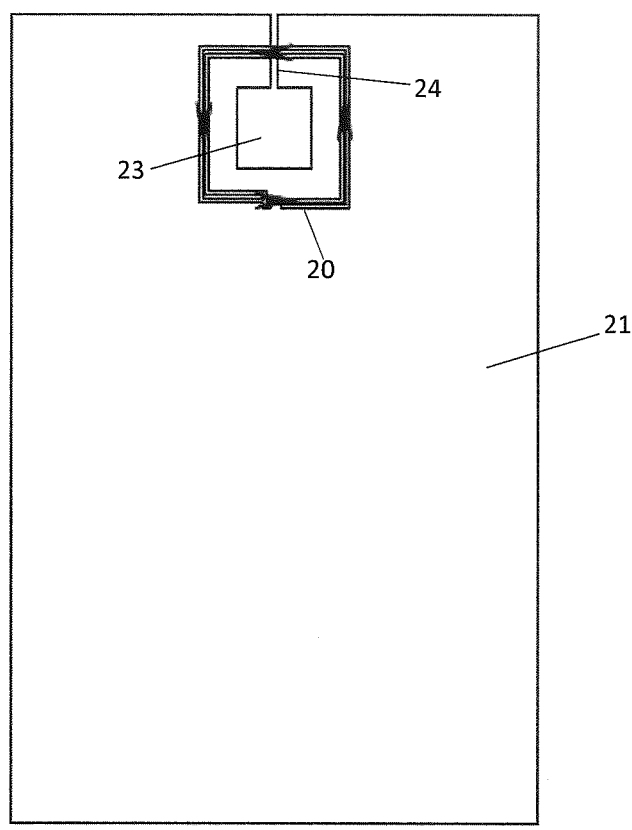
FIG. 1 is a structural diagram of an NFC antenna with a metal back cover in the prior art.
Figure 6:
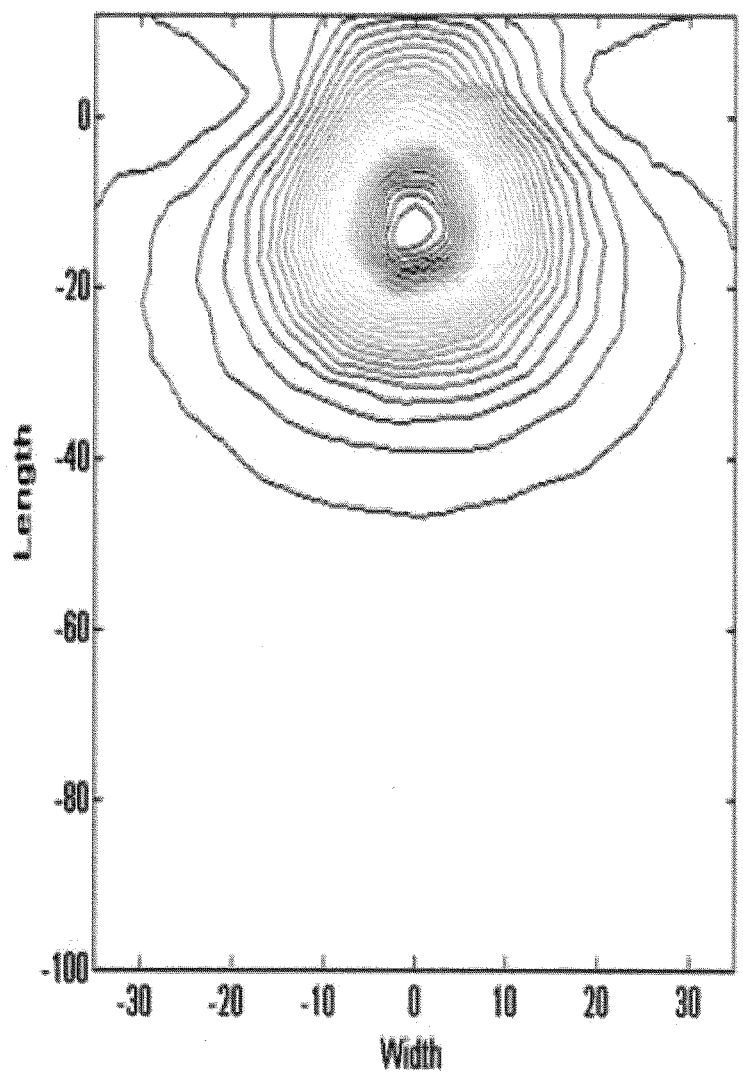
FIG. 6 is a magnetic field contour plot of the NFC antenna structure with a metal back cover in embodiment 1 of the invention.
Figure 7:
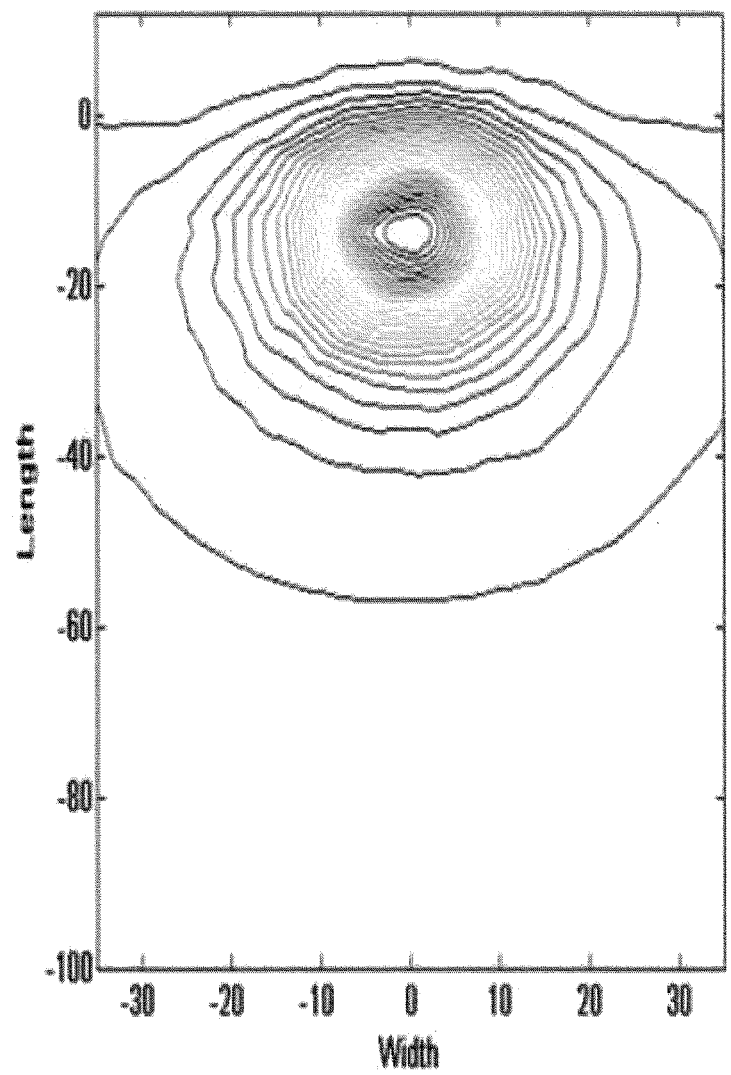
FIG. 7 is a magnetic field contour plot of the antenna structure shown in FIG. 1.
Figure 8:
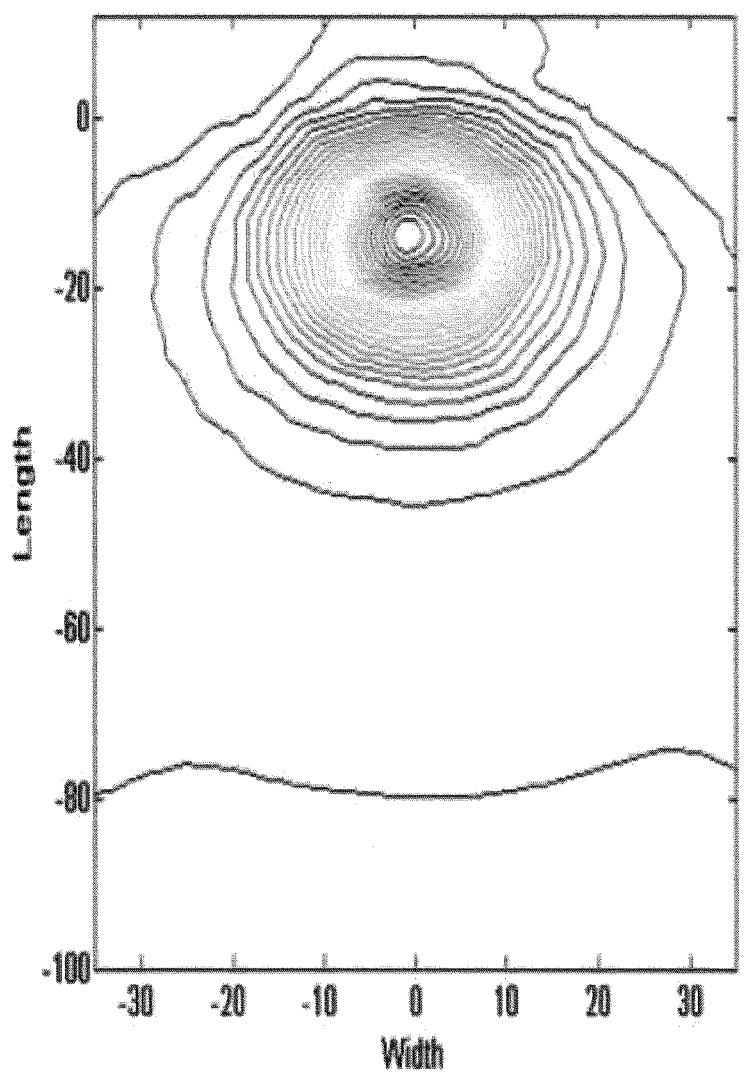
FIG. 8 is a magnetic field contour plot of the antenna structure shown in FIG. 1 with additional metal back cover 5.

FIG. 6 is the contour plot of the magnetic field Hz component at the position 20 mm outside the first metal back cover 1 for the high performance NFC antenna in the embodiment, FIG. 7 is the magnetic field contour plot at the position 20 mm outside the metal back cover for an antenna in the prior art, FIG. 8 is the magnetic field contour plot at the position 20 mm outside the first and second metal back covers 1 and 5 after the second metal back cover 5 is additionally arranged on the basis of FIG. 1. It can be seen by comparing FIG. 6 and FIGS. 7-8 that when the wiring arrangement of the NFC antenna coil of the invention is used, the effective eddy currents with considerable intensity 'penetrate' to the second metal back cover 5 from the first metal back cover 1 (please refer to FIG. 6), and therefore, the performance of the NFC antenna is enhanced; however, when the wiring scheme of the NFC antenna coil in the prior art is adopted, even if it is under the condition of the second metal back cover being additionally arranged, the effective eddy currents on the first metal back cover and/or the second metal back cover do not have significant change, in other words, the eddy currents penetrating from the first metal back cover to the second metal back cover are limited or negligible. It is shown by experimental results that if the wiring scheme of the NFC antenna in the prior art is adopted, whether the second metal back cover exists or not, the read and write distance of the NFC antenna has no obvious change. However, it is shown by the experimental results that when the wiring scheme of the NFC antenna coil 2 in the invention is adopted, the performance of the NFC antenna 2 of the invention is enhanced by 8%-15% or so compared with the wiring scheme of the NFC antenna coil in the prior art. In particular, in the situation where the second metal back cover 5 does not appear in the NFC antenna of the invention, the performance of the antenna in the invention is still enhanced by 8% or so compared with the prior art; in the situation where the second metal back cover 5 appears in the NFC antenna of the invention, the performance of the antenna in the invention is improved by 15% or so compared with the prior art. The performance difference between the antenna with the second metal back cover 5 and the antenna without the second metal back cover 5 shows that the wiring scheme of the antenna coil 2 in the invention can excite the effective eddy currents on the second metal back cover 5 better.

In conclusion, by fully utilizing the various parts of a metal back cover 5, arranging a NFC antenna coil outside a through-hole and a first slit 4, and avoiding an intersection of the NFC antenna coil and the first slit, the effect of optimally changing the flow direction distribution and intensity of eddy currents is achieved, eddy current loops in the same direction as the electric current of an antenna can be generated simultaneously on an upper metal back cover and a lower metal cover, the performance of an antenna is further enhanced, and the shielding effect of the metal back covers on the NFC antenna is eliminated. The NFC antenna is characterized by a simple structure, excellent performance and the like.

The above are only embodiments of the invention and are not to limit the patent scope of the invention. Any equivalent changes made according to the specification or drawing contents of the invention, or direct or indirect application in the relevant technical fields should be included in the patent protection range of the invention.

The invention claimed is:

1. An NFC antenna, comprising:
a first metal back cover, and
an antenna coil;
wherein
the antenna coil is located on an inner side of the first metal back cover, a through-hole and a first slit are formed in the first metal back cover, the first slit extending from one edge of the through-hole to one edge of the first metal back cover, the antenna coil surrounds the through-hole and the first slit, and the antenna coil has a part which does not overlap with the first metal back cover nor intersects with the first slit in a direction perpendicular to the first metal back cover.

2. The NFC antenna according to claim 1, wherein the antenna further comprises a second metal back cover above the one edge of the first metal back cover, with a second slit formed between the second metal back cover and the first metal back cover, and the part not overlapping with the first metal back cover overlaps with the second metal back cover in the direction perpendicular to the first metal back cover.

3. The NFC antenna according to claim 2, wherein the first slit extends from the through-hole to the second slit.

4. The NFC antenna according to claim 1, wherein the antenna coil is in a convex shape, a circular shape or an oval shape.

5. The NFC antenna according to claim 2, wherein the antenna coil is in a convex shape, a circular shape or an oval shape.

6. The NFC antenna with a metal back cover according to claim 4, wherein the antenna coil is in a convex shape, a circular shape or an oval shape.

7. The NFC antenna with a metal back cover according to claim 1, wherein a size of the through-hole is 5 mm×5 mm-20 mm×20 mm.

8. The NFC antenna according to claim 2, wherein a size of the through-hole is 5 mm×5 mm-20 mm×20 mm.

9. The NFC antenna according to claim 3, wherein a size of the through-hole is 5 mm×5 mm-20 mm×20 mm.

10. The NFC antenna according to claim 3, wherein a width of the first slit is 0.5 mm-1.5 mm; and a width of the second slit is 1.0 mm-2.5 mm.

11. The NFC antenna according to claim 1, further comprising a fingerprint identification module, a camera module, a flashlight module or other sensor module arranged to be operable through the through-hole.

* * * * *